(12) United States Patent
Rosowski

(10) Patent No.: US 7,188,350 B2
(45) Date of Patent: Mar. 6, 2007

(54) PROMOTIONAL ARTICLE AND METHOD FOR ASSEMBLING THE ARTICLE

(75) Inventor: Ralf Rosowski, Bielefeld (DE)

(73) Assignee: Topac Multimediaprint GmbH (DE)

( * ) Notice: Subject to any disclaimer, the term of this patent is extended or adjusted under 35 U.S.C. 154(b) by 427 days.

(21) Appl. No.: 10/273,694

(22) Filed: Oct. 18, 2002

(65) Prior Publication Data

US 2004/0076109 A1    Apr. 22, 2004

(51) Int. Cl.
*G11B 7/24* (2006.01)
(52) U.S. Cl. .................................................. 720/720
(58) Field of Classification Search ............... 369/273, 369/274; 720/720; 206/459.1
See application file for complete search history.

(56) References Cited

U.S. PATENT DOCUMENTS

| | | | | |
|---|---|---|---|---|
| 1,479,847 A * | 1/1924 | Widmann | .................... | 264/107 |
| 2,020,381 A * | 11/1935 | Labowitz et al. | ............ | 206/216 |
| 2,714,448 A * | 8/1955 | Brown | ......................... | 206/216 |
| 3,430,761 A * | 3/1969 | Pelkey | ......................... | 206/309 |
| 3,589,736 A * | 6/1971 | Gorman | ....................... | 369/273 |
| 4,294,354 A * | 10/1981 | Ariga | ........................... | 206/335 |
| 4,511,033 A | 4/1985 | May | ............................ | 206/216 |
| 5,090,561 A * | 2/1992 | Spector | .................... | 206/308.1 |
| 5,474,173 A | 12/1995 | Hodapp | ....................... | 206/232 |
| 5,579,296 A * | 11/1996 | Smith et al. | ................. | 369/273 |
| 5,600,628 A * | 2/1997 | Spector | ....................... | 720/725 |
| 5,740,155 A * | 4/1998 | Spector | ....................... | 720/726 |
| 5,869,163 A * | 2/1999 | Smith et al. | ................ | 428/64.1 |
| 5,882,555 A * | 3/1999 | Rohde et al. | ............... | 264/1.33 |
| 5,982,736 A * | 11/1999 | Pierson | ....................... | 369/273 |
| 6,070,752 A * | 6/2000 | Nava et al. | .................. | 220/521 |
| 6,112,891 A * | 9/2000 | Wohl et al. | .................. | 206/223 |
| 6,338,405 B1 * | 1/2002 | Yoerg et al. | .............. | 206/308.1 |
| 6,473,391 B1 * | 10/2002 | Chen | .......................... | 720/718 |
| 6,533,114 B1 * | 3/2003 | Gordon et al. | .............. | 206/232 |
| 6,840,375 B2 * | 1/2005 | Gordon et al. | .............. | 206/232 |
| 2001/0050239 A1 * | 12/2001 | Ishii | ......................... | 206/308.1 |
| 2003/0141206 A1 * | 7/2003 | Innis | ........................ | 206/308.1 |

* cited by examiner

*Primary Examiner*—David Davis
(74) *Attorney, Agent, or Firm*—Husch & Eppenberger, LLC

(57) ABSTRACT

A promotional article and a method for assembling the promotional article is disclosed. The promotional article includes a product, a flexible data carrier placed over the product, and a cover which secures the flexible data carrier to the product. The promotional article may further include advertising indicia on the flexible data carrier. The method includes the steps of: providing a product, placing a flexible data carrier on the product, and covering the flexible data carrier and product with a cover.

25 Claims, 9 Drawing Sheets

PROMOTIONAL ARTICLE AND METHOD FOR ASSEMBLING THE ARTICLE

FIELD OF THE INVENTION

This invention relates generally to advertising media and, more particularly, to a promotional article having a flexible data carrier and an advertisement which may be applied to various products.

BACKGROUND OF THE INVENTION

U.S. Pat. No. 4,511,033 issued to May discloses a promotional device including a laminated record attached to a cardboard beverage carrier. The beverage carrier holds a number of beverages. May expresses that laminated records are attractive promotional items because they provide sound in addition to an advertising message.

U.S. Pat. No. 5,474,173 issued to Hodapp discloses a promotional card insert used in conjunction with plastic bottle holders and beverage bottles. The promotional card has text and/or graphics printed on its surfaces There remains a need in the art for improved promotional devices which can be used with standard products.

SUMMARY OF THE INVENTION

An aspect of the present invention is to provide a promotional article that includes a flexible data carrier attached directly to a product.

Another aspect of the present invention is to provide a promotional article that provides an audio and/or video advertising message.

Still another aspect of the present invention is to provide a method for assembling a promotional article.

In accordance with the above aspects of the invention, there is provided a promotional article including a product, a flexible data carrier, and means for securing the flexible data carrier to the product.

In accordance with another aspect of the invention there is provided a method for assembling a promotional article having a three-dimensional product with a substantially smooth surface, including the steps of placing a flexible data carrier containing digital data in proximity to the substantially smooth surface of the product; and substantially covering the flexible data carrier with a cover circumjacent the product to hold the flexible data carrier on the product.

These aspects are merely illustrative and should not be deemed as limiting in any manner. These and other aspects, features and advantages of the present invention will become apparent from the following detailed description when taken in conjunction with the drawings.

BRIEF DESCRIPTION OF THE DRAWINGS

Reference is now made to the drawings which illustrate the best known mode of carrying out the invention and in which the same reference characters indicate the same parts throughout the several views:

FIGS. 1 and 1a are top views of a flexible data carrier showing different shapes of the periphery.

DETAILED DESCRIPTION

The following detailed description provides numerous specific details for a thorough understanding of the invention; however, it will be understood by those skilled in the art that the invention may be practiced without these specific details. In other instances, well-known methods, procedures, and components have not been described in detail so as not to obscure the present description.

Figure 1:
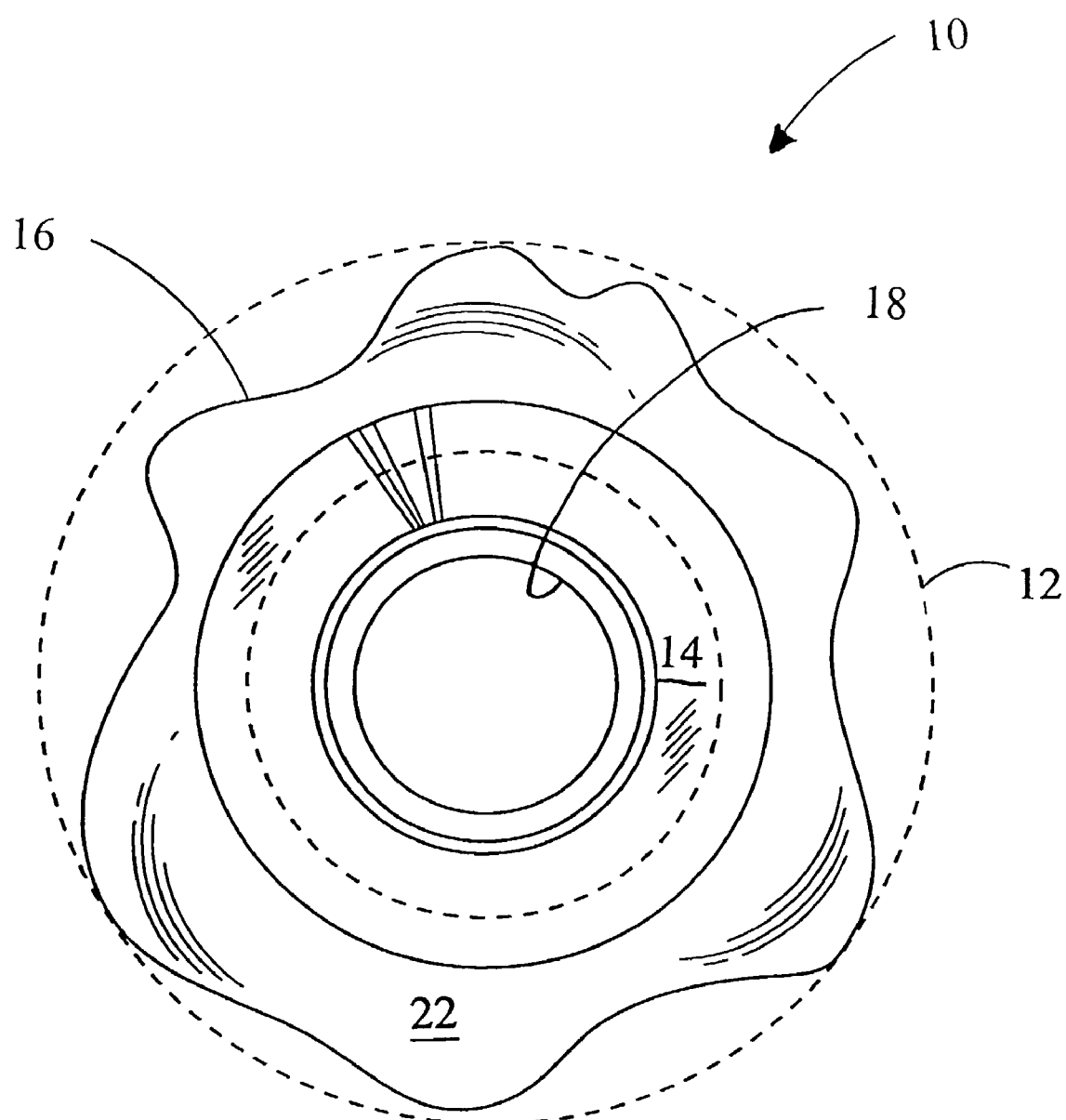
Figure 1:
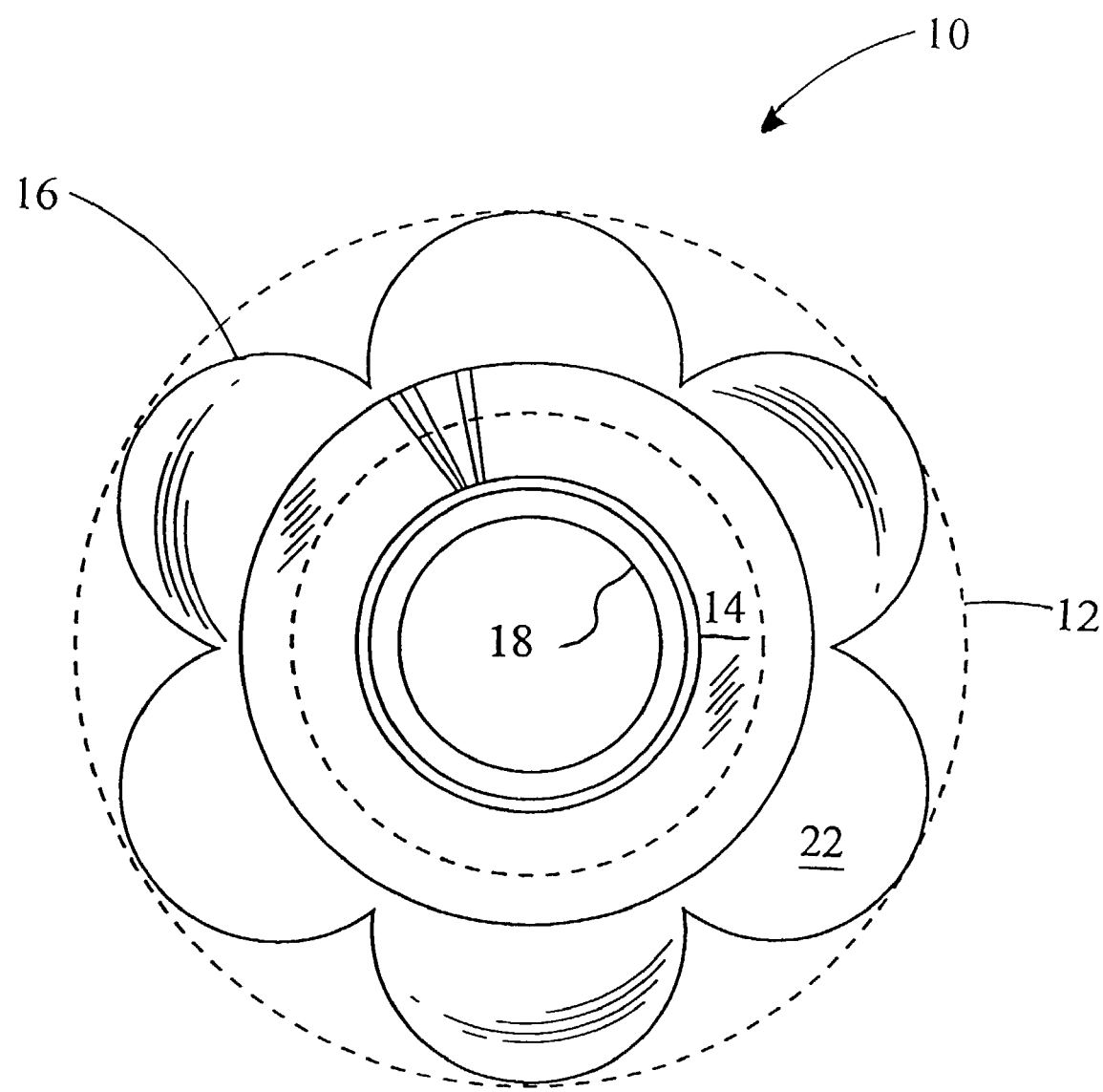

Referring now to FIG. 1, a flexible data carrier is generally indicated by the numeral 10. The flexible data carrier 10 has embedded digital data 14 which typically is one of two different sized areas. One is about 8 cm in diameter that can hold approximately 220 mega-bytes. Another is about 12 cm in diameter and can hold approximately 650 mega-bytes. The digital data 14 may be in a digital audio (CD) or digital versatile disc (DVD) format. The digital data 14 may comprise video and/or audio data for supplying an advertising message, a greeting, entertainment, educational information, or the like. For example, the digital data can be an audio by a particular artist, a short video clip of a movie, or simply an advertising message for a particular product or company. The advertising message or indicia can also be a writing, logo, illustration, or the like on the surface of the flexible data carrier 10. The advertising indicia may be a silk-screen printing or a dry offset-print label.

The data carrier 10 has a peripheral edge 16. In one embodiment, the edge 16 has an irregular shape; however, it is understood that the edge may also be any shape, including circular. As another example, in FIG. 1a the edge 16 is scalloped. Returning to FIG. 1, numeral 12 indicates an outside diameter of a standard compact disk (CD), which is approximately 120 mm. To use the flexible data carrier 10 in a standard CD player, the edge 16 must be within the outside diameter 12 of a standard CD. Between the edge 16 and the digital data 14 is a lead-out area 22. The flexible data carrier 10 has a central opening 18. The flexible data carrier 10 is designed to be used with a two-piece adapter (not shown) conveniently made from polystyrene and polycarbonate. The adapter contains a central hole 15 mm in diameter. The adapter fits in the opening 18 of the flexible data carrier 10 and allows the user to play the data carrier in a standard CD player, DVD player, or CD-ROM drive.

Figure 2:
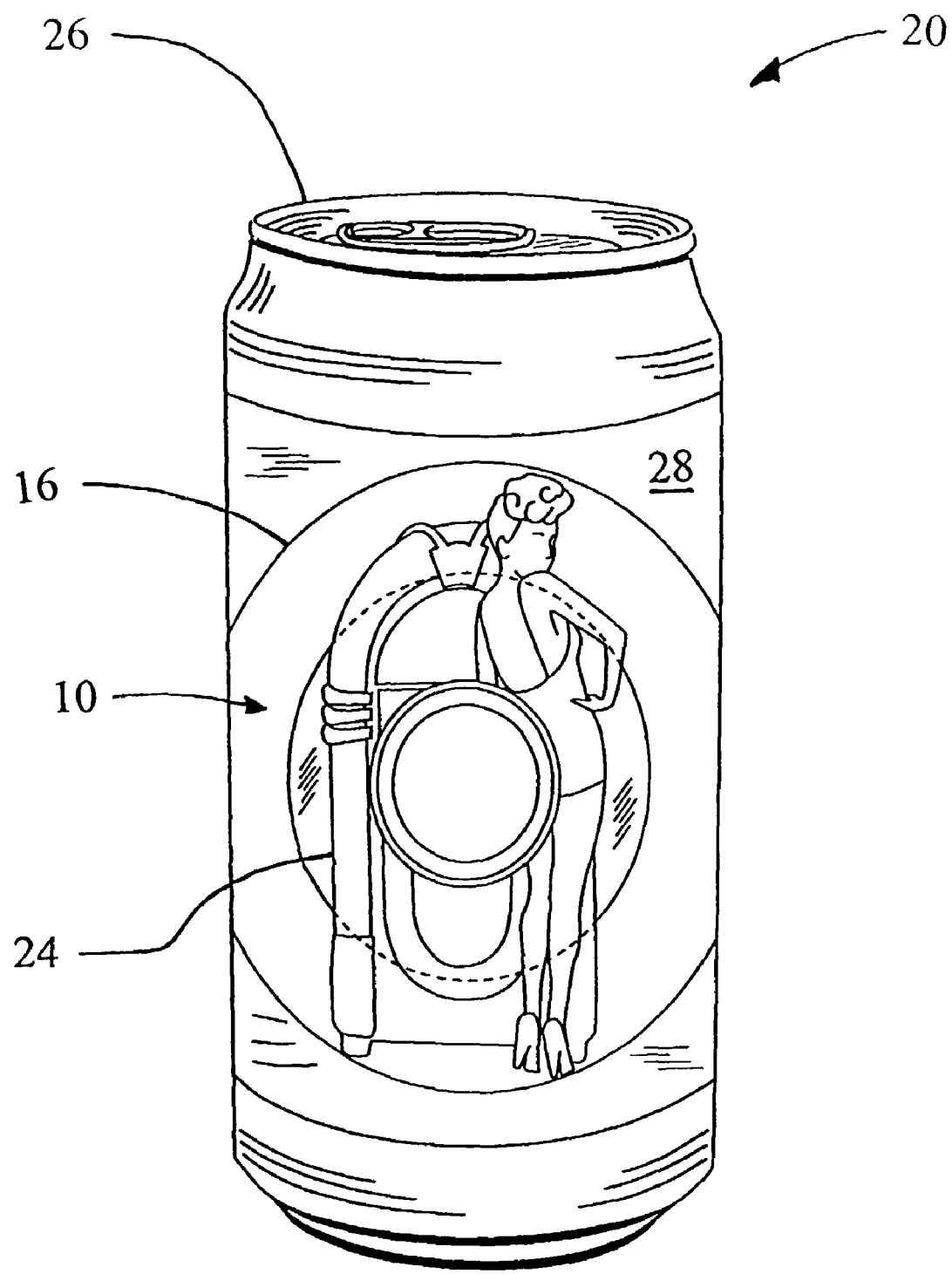
FIGS. 2 through 8 are a perspective views of different embodiments of a promotional article.

Referring now to FIG. 2, a promotional article according to one embodiment of the present invention is generally indicated by numeral 20. The promotional article 20 includes a product 26. In a preferred embodiment, the product 26 is a beverage container. The beverage container, for example an aluminum can, has a cylindrical shape and a smooth surface. Applied to the product is the flexible data carrier 10 which, in this embodiment, has a circular periphery. Covering the flexible data carrier 10 is a substantially transparent cover 28. The cover 28 secures the data carrier 10 to the product 26. The cover 28 may be heat shrinkable, such as a shrink wrap plastic. The cover 28 may be attached to the product 26 through the use of adhesive. The cover 28 also increases the difficulty for individuals to tamper with the data carrier 10 before product purchase. The term "substantially transparent" is meant to include transparent plastics and also at least semi-opaque materials, and colored covers to the extent that they allow items to be viewed therethrough. It is intended that a consumer may view the flexible data carrier 10 and any label or message on it.

Figure 3:
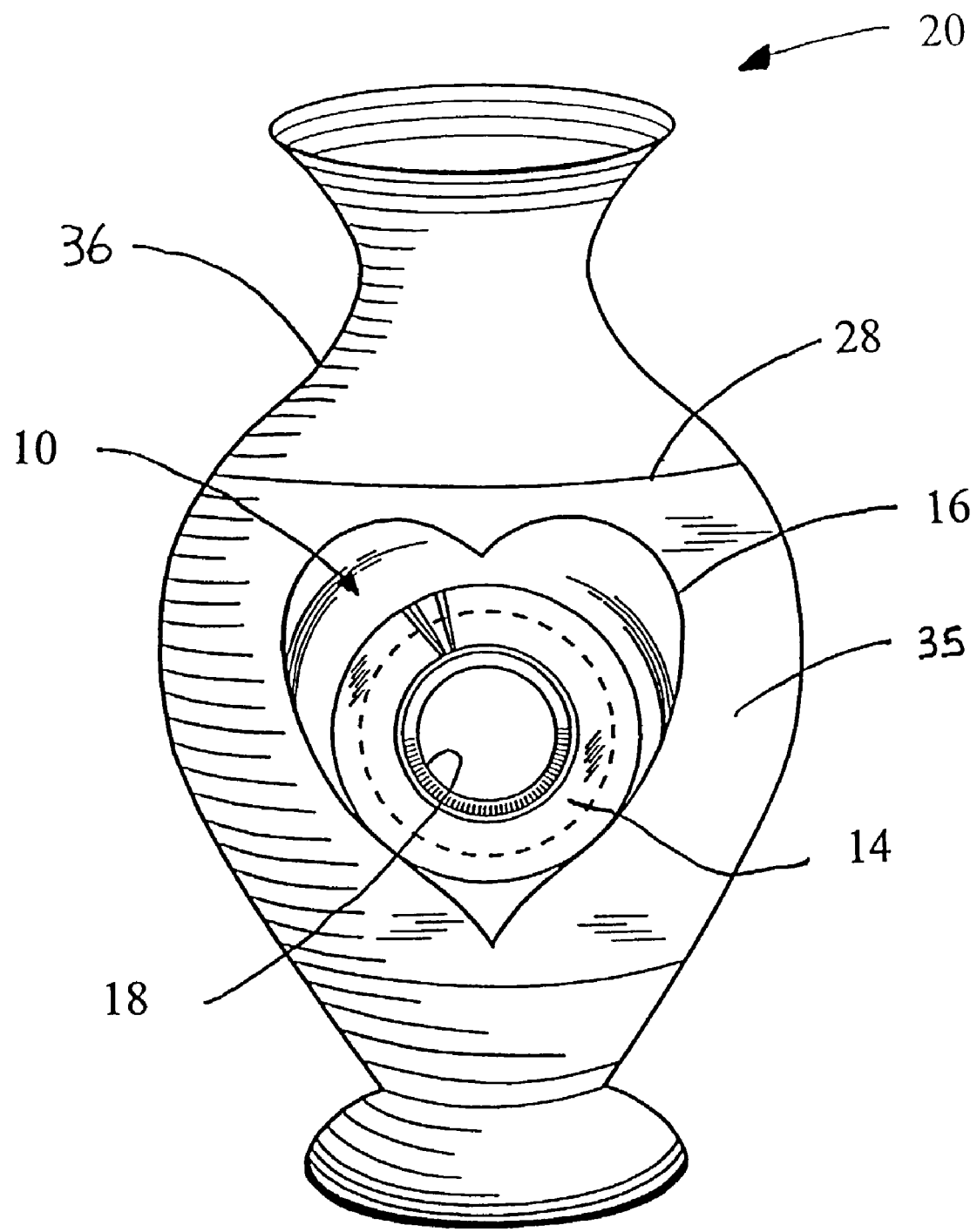

FIG. 3 shows a product 36 in the shape of an urn having a substantially smooth surface 35. Here, the flexible data carrier 10 is on the surface 35 which is generally spherical in shape; however the radius of the sphere is great enough that the data carrier 10 lies substantially flat against it, at least in the area of the digital data 14. This result is aided by the opening 18 and the shaped edge 16. The illustrated edge 16 is heart-shaped. The urn 36 may be plastic, glass, metal, or ceramic. As an example, the promotional article 20 may be designed for St. Valentine's Day such that the urn 36 may contain flowers and a heart-shaped flexible data carrier 10 with a romantic song. Indicia on the flexible data carrier 10 may be a greeting such as "I love you." As previously described a substantially transparent cover 28 overlies the data carrier 10 and retains it on the urn 36.

Figure 4:
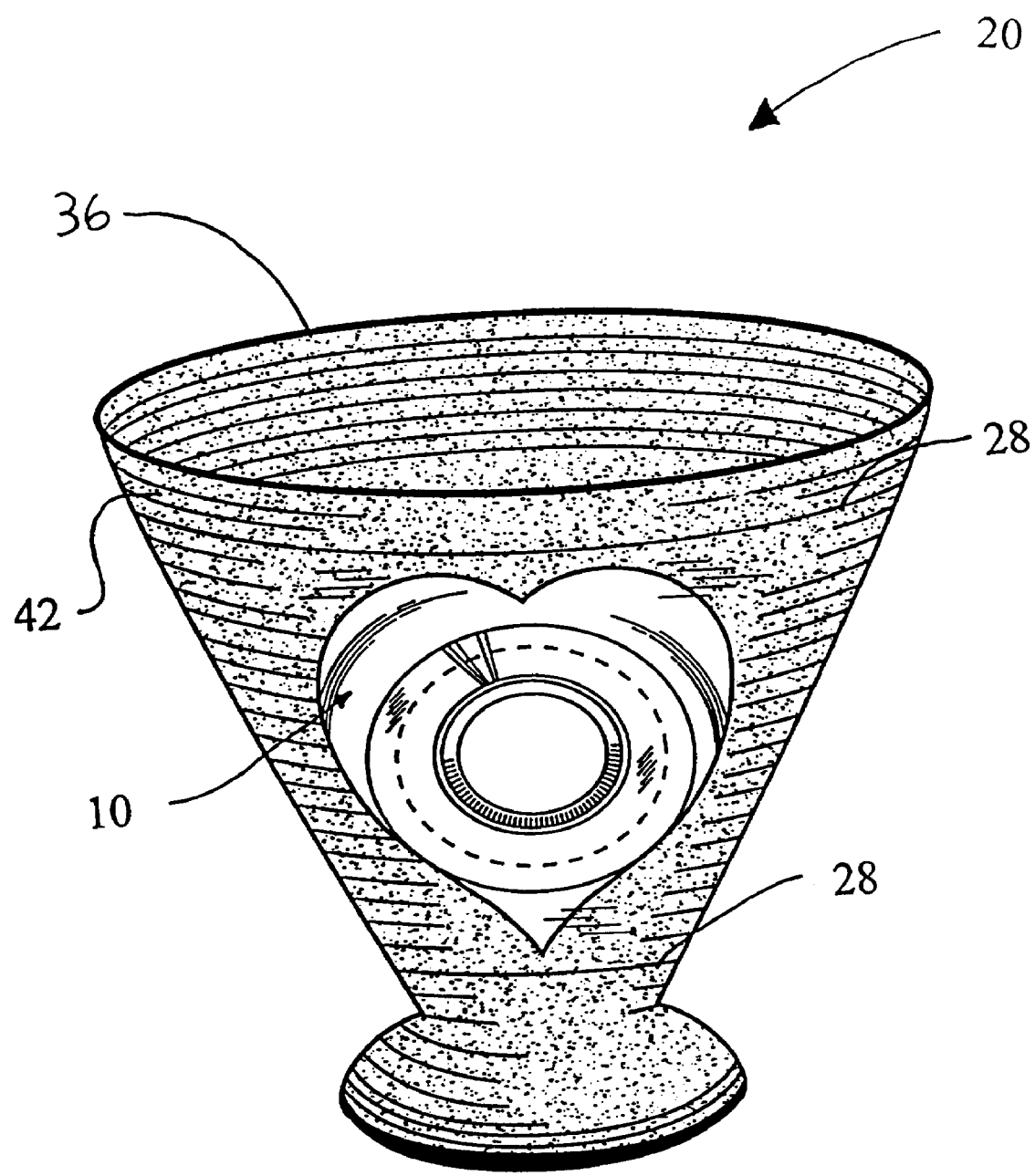

In FIG. 4 the promotional article 20 includes a product in the form of a vase 36 having a frusto-conical or cone-shaped upper portion. The vase 36 has a textured surface 42, for example, frosted. Thus, the term "substantially smooth" includes such surfaces. As in the FIG. 3 embodiment, the cover 28 overlies the data carrier 10 and retains it on the vase 36.

Figure 5:
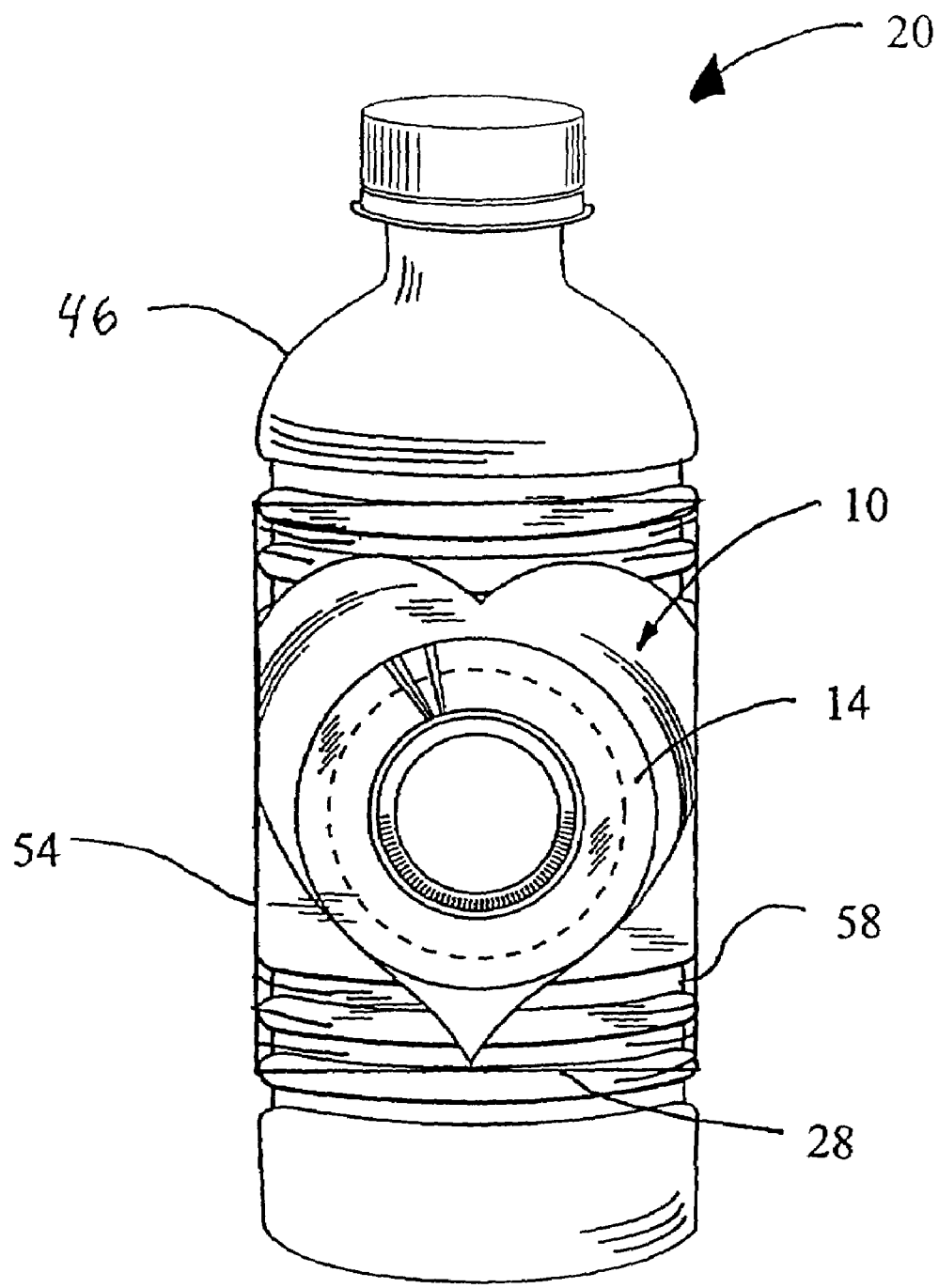

Referring now to FIG. 5, a product 46 is a bottle. For example, the bottle may be a twenty-ounce plastic beverage container. The bottle 46 has a plurality of grooves 58 which are exaggerated in width in the drawing. Even though it has a plurality of grooves 58, the bottle 46 has a "substantially smooth surface" because the flexible data carrier can span small grooves without affecting the integrity of the digital data 14. The bottle 46 may have a product label 54 identifying the ingredients and containing other consumer information. In one example, the product label 54 is placed over the bottle 46 and the flexible data carrier 10 is placed over the product label 54. In another example, the flexible data carrier 10 is placed over the bottle 46 and the product label is on the cover 28 which extends over the flexible data carrier 10. In this event the cover 28 has a "clear" area which advantageously overlies at least a portion of the flexible data carrier 10. The cover 28 may also contain promotional material or advertising indicia. The advertising indicia may be, for example, a message indicating that the flexible data carrier 10 is attached to the product, a description of what the flexible data carrier contains, a slogan, etc.

While the flexible data carrier may advantageously be placed on the side of the product, it may also be placed on the top of the product. In three further embodiments, the promotional article includes a container with a cap or lid having a substantially smooth recess, such that the flexible data carrier lies within the recess. The cap or lid further include a rim surrounding the flexible data carrier. The rim conveniently holds and protects the flexible data carrier.

Figure 6:
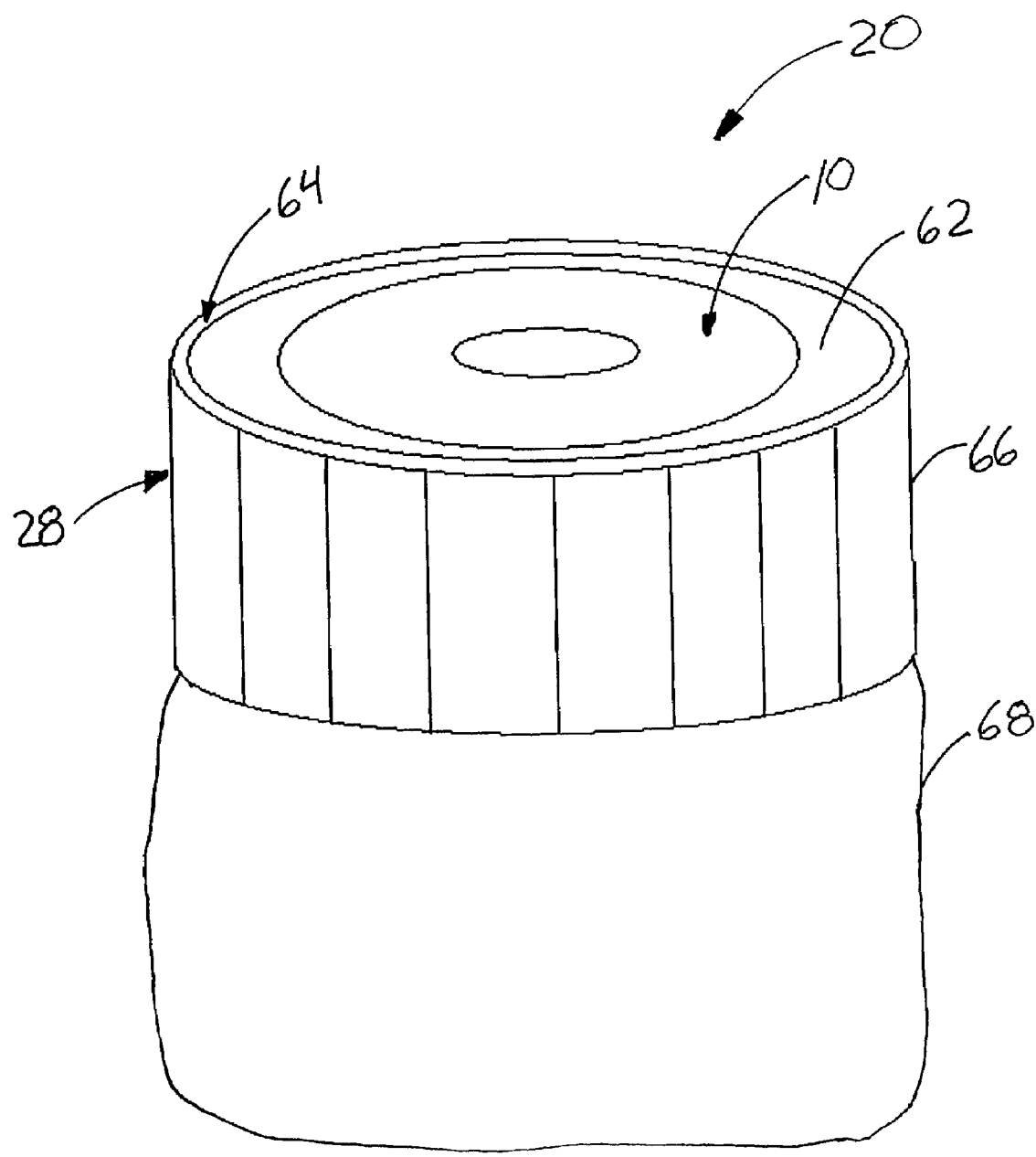

FIG. 6 shows the promotional article 20 with a product in the form of a screw-on cap 66 having a substantially smooth recess 62. The screw-on cap 66 conveniently may be used, among other things, to seal a jar 68 of comestibles. The flexible data carrier 10 lies within the recess 62. The screw-on cap 66 also includes a rim 64. The rim 64 conveniently holds and protects the flexible data carrier 10. The promotional article 20 may further include the substantially transparent cover 28. In one example, the cover 28 encases only the flexible data carrier 10 and is attached to the product 66 by means of an adhesive, such as a gel. In another example, the cover 28 encases at least the flexible data carrier 10 and the screw-on cap 66 but may further include the jar 68. In this last example, the cover 28 would be in the form of shrink wrap plastic. The cover 28 may also contain promotional material or advertising indicia.

Figure 7:
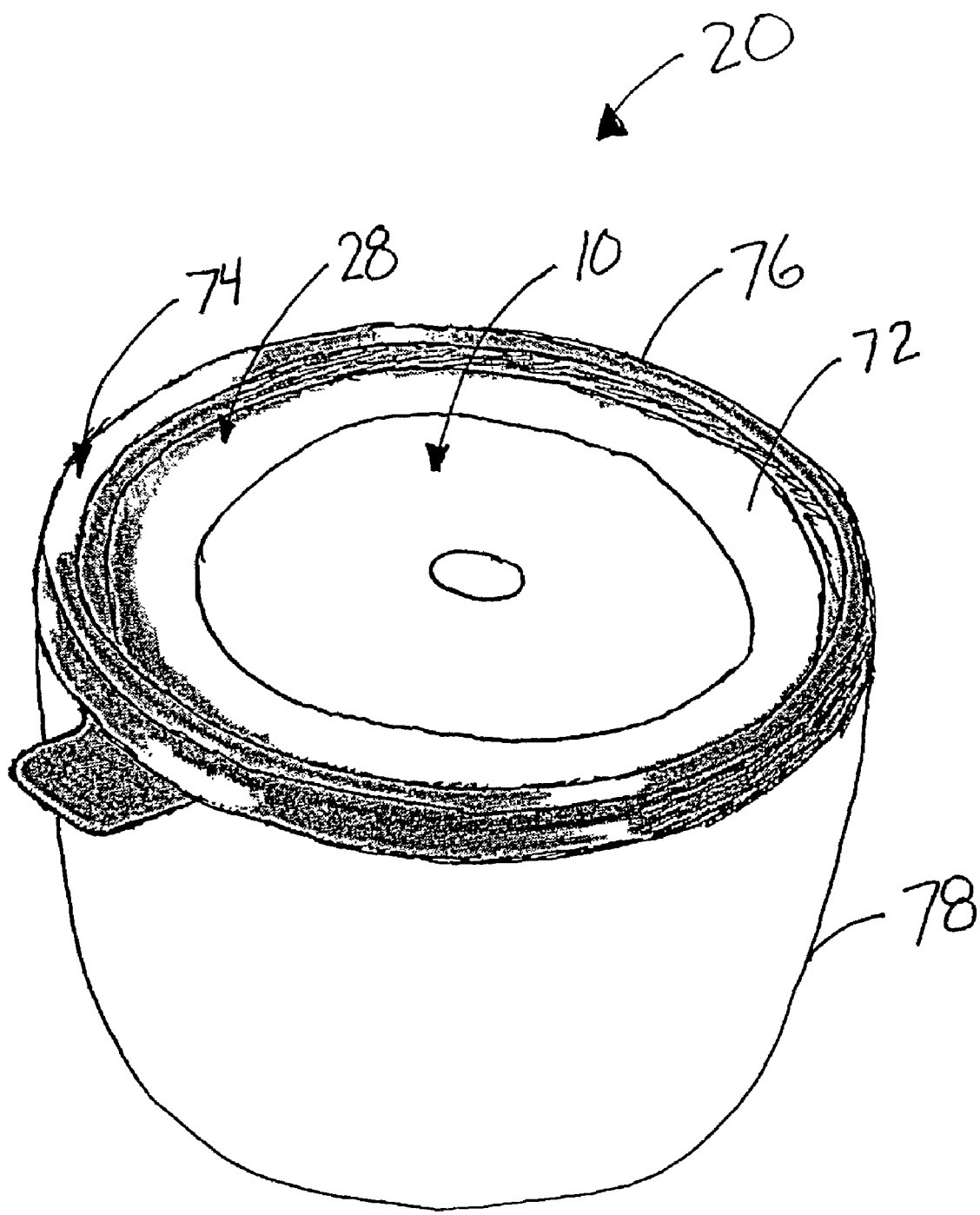

In FIG. 7, a product is a snap-on lid 76. The snap-on lid 76 conveniently may be used to seal, among other things, a tub 78 of perishable items. The snap-on lid 76 has a substantially smooth recess 72. The flexible data carrier 10 lies within the recess 72. The snap-on lid 76 also includes a rim 74. The rim 74 conveniently holds and protects the flexible data carrier 10. The promotional article 20 may further include the substantially transparent cover 28. In one example, the cover 28 encases only the flexible data carrier 10 and is attached to the product 76 by means of an adhesive, such as a gel. In another example, the cover 28 encases at least the flexible data carrier 10 and the snap-on lid 76 but may further include the tub 78. In this last example, the cover 28 would be in the form of shrink wrap plastic. The cover 28 may also contain promotional material or advertising indicia.

Figure 8:
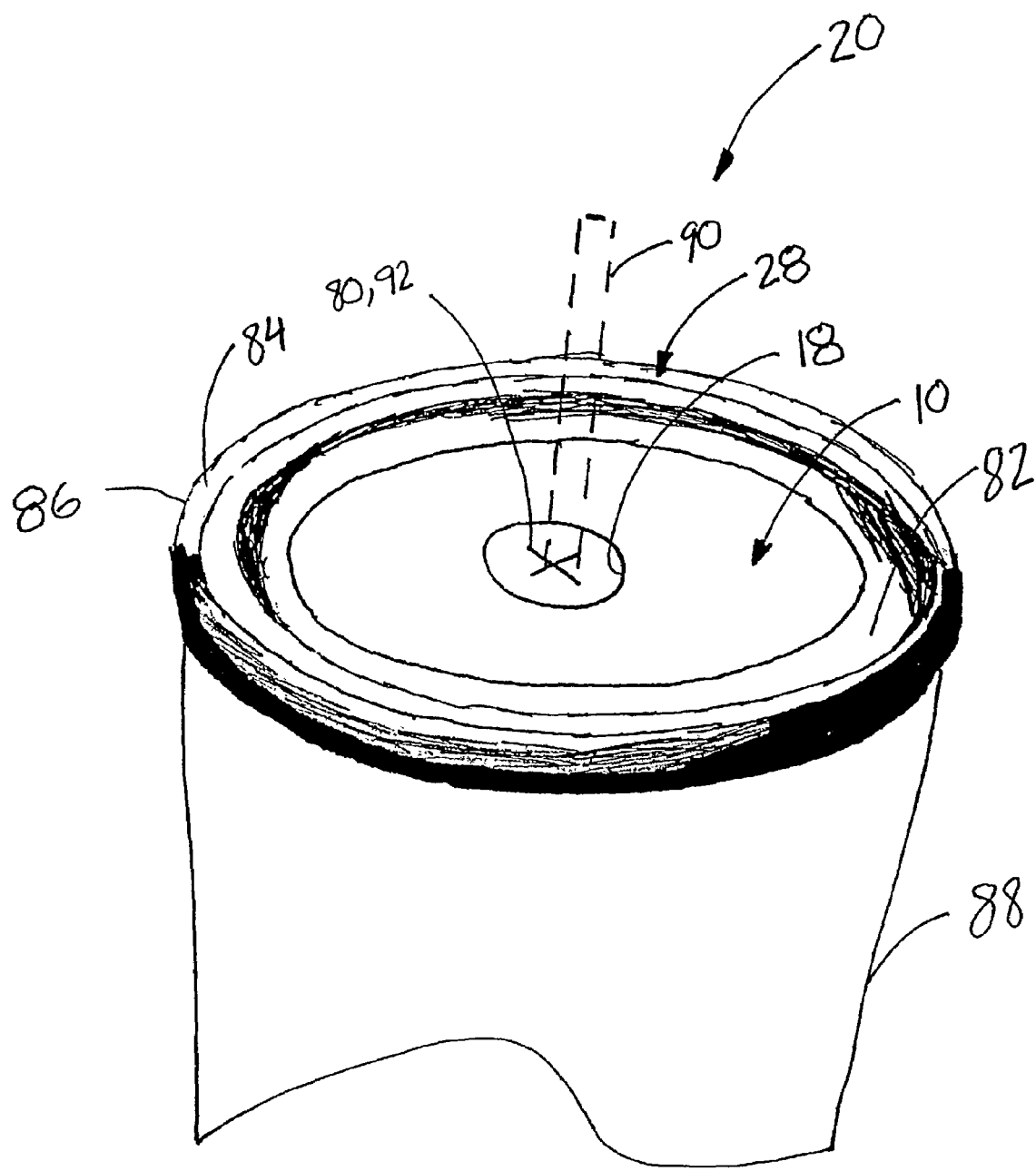

FIG. 8 shows a product in the shape of a snap-on lid 86 having a substantially smooth recess 82 and an opening 80. The opening 80 may be a slit, a piercing, or a hole. The snap-on lid 86 with the opening 80 may be used to seal a fountain cup 88 for holding liquids, such as soda pop. The flexible data carrier 10 lies within the recess 82 such that the opening 80 is substantially centered within the opening 18 of the flexible data carrier 10. Accordingly, a straw 90 may be located within the opening 80. The snap-on lid 86 further includes a rim 84. The rim 84 conveniently holds and protects the flexible data carrier 10. The promotional article 20 may further include the substantially transparent cover 28. In one example, the cover 28 encases only the flexible data carrier 10 and is attached to the product 86 by means of an adhesive, such as a gel. In another example, the cover 28 encases at least the flexible data carrier 10 and the snap-on lid 86 but may further include the fountain cup 88. In this last example, the cover 28 would be in the form of shrink wrap plastic. The cover 28 may also include a perforation 92 such that the straw 90 may be forced through the cover 28, inserted into the opening 18 of the flexible data carrier 10, and forced through the opening 80 of the snap-on lid 86. The cover 28 may also contain promotional material or advertising indicia.

A variation of the embodiment shown in FIG. 8 would further include a protrusion in the center of the snap-on lid 86. The protrusion would have a diameter such that the opening 18 of the flexible data carrier 10 fits over the protrusion. In this manner, the flexible data carrier 10 is operatively connected to the snap-on lid 86 by means of the protrusion and the flexible data carrier opening 18. For this embodiment, no adhesive or the cover 28 may be necessary.

In FIGS. 2–5, it will be recognized that the product 26 can have any shape so long as the flexible data carrier 10 can be wrapped around the product 26 in such a way that the digital data 14 embedded on flexible data carrier 10 is not adversely affected. In FIGS. 6–8 it will be recognized that the flexible data carrier 10 may be placed on the top of any product with a substantially smooth surface and a rim. Thus, the flexible data carrier 10 may be placed on any product 26 with a substantially flat surface, a cylindrical surface, or a surface with a sufficient radius of curvature such that the flexible data carrier 10 is not harmed or damaged to an extent that it would not be playable.

The method of applying a promotional article to a product includes the steps of: providing a product; placing a flexible data carrier in close proximity with the product; and covering the flexible data carrier and product with a cover. For example, the method includes providing a beverage container, holding the flexible data carrier to the beverage container, and wrapping a cover around the product and the flexible data carrier to hold the flexible data carrier in place. Adhesive may be applied to the cover to hold the flexible data carrier to the product. But if a stretchable cover is used, contraction of the cover material alone may be sufficient to cover the flexible data carrier and product. The method may further include forming advertising indicia on the flexible data carrier product. However, in other instances it may be more desirable to form the advertising indicia on the cover. This forming of advertising indicia may be through silk screening or by printing. If the cover is heat-shrinkable, the method may further include the step of heating the cover, whereby the cover shrinks and conforms to the shape of the product.

In another embodiment, the method of applying a promotional article to a product includes the steps of: providing a product, attaching a sleeve to the product, opening the sleeve, placing a flexible data carrier in close proximity with the product such that the flexible data carrier is within the sleeve, and closing the sleeve. For example, the method may include providing a magazine or mailer, attaching a plastic sleeve to the magazine, placing the flexible data carrier within the sleeve, and closing the sleeve. In a preferred embodiment the sleeve is transparent.

Other objects, features and advantages of the present invention will be apparent to those skilled in the art. The invention in its broader aspects is not limited to the specific steps or the order of the steps, nor to the embodiments shown and described but departures may be made therefrom within the scope of the accompanying claims without departing from the principles of the invention and without sacrificing its chief advantages. The invention should not be limited except as required by the scope of the appended claims and their equivalents.

What is claimed is:

1. A promotional article, comprising:
   a flexible data carrier containing digital data on a preselected area thereof, the flexible data carrier having an overall dimension less than 125 millimeters and a central opening greater than 15 millimeters;
   a three-dimensional product having a substantially smooth surface over an area at least as great as the area of the digital data, said product exceeding 125 millimeters in at least one dimension; the surface being non-planar; and
   an attachment device, said attachment device holding the data carrier on the substantially smooth surface of the product such that substantially all of one side of the flexible data carrier is in contact with the surface.

2. The promotional article according to claim 1, in which said attachment device includes a rim, the rim substantially circumscribing an outside diameter of said flexible carrier.

3. The promotional article of claim 2 wherein said rim is integral to said product.

4. The promotional article of claim 2 wherein said rim substantially circumscribes said flexible data carrier.

5. The promotional article of claim 2 wherein said rim is substantially circular.

6. The promotional article according to claim 1, further comprising a cover substantially encasing at least the flexible data carrier.

7. The promotional article according to claim 6, in which the cover substantially encases the flexible data carrier and the product.

8. The promotional article according to claim 6, further comprising: advertising indicia formed on the cover.

9. The promotional article according to claim 6, further comprising: an adhesive to secure the cover.

10. The promotional article according to claim 6, in which the cover is stretchable.

11. The promotional article of claim 6 wherein said cover is integrally formed with said attachment device.

12. The promotional article of claim 6 wherein said cover is substantially transparent in an area at least partially overlying said flexible data carrier.

13. The promotional article according to claim 1, further comprising: advertising indicia formed on the flexible data carrier.

14. The promotional article according to claim 1, in which an outer periphery of the flexible data carrier is irregularly shaped.

15. The promotional article according to claim 1, in which the product further includes a product label.

16. The promotional article according to claim 1, in which the product is a container.

17. The promotional article according to claim 16, in which the container is cylindrical.

18. The promotional article of claim 1 further comprising advertising indicia on said attachment device.

19. The promotional article of claim 1 further comprising a recess dimensioned to closely cooperate with an outside diameter of said flexible data carrier and said recess having a substantially smooth bottom surface.

20. The promotional article of claim 19 wherein said recess is integral to said product.

21. The promotional article of claim 1 wherein said attachment device protects said flexible data carrier.

22. The promotional article of claim 1 wherein said attachment device substantially covers said flexible data carrier.

23. The promotional article of claim 1 wherein said attachment device has a non-planar surface and wherein said flexible data carrier bottom surface, and said bottom surface closely conforms to said non-planar surface of said attachment device in close cooperation.

24. The promotional article of claim 1 wherein said attachment device has a non-planar surface and wherein said flexible data carrier has a bottom surface, and said bottom surface closely conforms to said non-planar surface of said product.

25. A promotional article, comprising:
   a substantially cylindrical container having a generally smooth non-planar outer surface;
   a flexible data carrier containing digital data and having a circumferential edge;
   the flexible data carrier having one side in substantial contact with the outer surface of the container;
   advertising indicia visible from a second side of the flexible data carrier; and
   a substantially transparent cover overlying the flexible data carrier and securing the flexible data carrier to the container.

* * * * *